(12) United States Patent
Pilaz et al.

(10) Patent No.: US 8,725,352 B2
(45) Date of Patent: May 13, 2014

(54) POWER ASSISTED STEERING FOR AN AUTOMOBILE

(75) Inventors: Pierre Pilaz, Saint Marcel l'Eclaire (FR); Stephane Cassar, Caluire (FR); Pascal Moulaire, Roanne (FR)

(73) Assignee: JTEKT Europe (FR)

( * ) Notice: Subject to any disclaimer, the term of this patent is extended or adjusted under 35 U.S.C. 154(b) by 581 days.

(21) Appl. No.: 13/061,863

(22) PCT Filed: Jul. 16, 2009

(86) PCT No.: PCT/FR2009/051412
§ 371 (c)(1),
(2), (4) Date: Apr. 14, 2011

(87) PCT Pub. No.: WO2010/026320
PCT Pub. Date: Mar. 11, 2010

(65) Prior Publication Data
US 2011/0184609 A1  Jul. 28, 2011

(30) Foreign Application Priority Data

Sep. 3, 2008 (FR) ..................... 08 04828

(51) Int. Cl.
| | |
|---|---|
| *A01B 69/00* | (2006.01) |
| *B62D 5/04* | (2006.01) |
| *B62D 7/15* | (2006.01) |
| *B62D 6/02* | (2006.01) |
| *B62D 6/04* | (2006.01) |
| *B62D 6/00* | (2006.01) |

(52) U.S. Cl.
CPC ............. *B62D 5/0463* (2013.01); *B62D 7/159* (2013.01); *B62D 5/0481* (2013.01); *B62D 6/008* (2013.01); *B62D 6/02* (2013.01); *B62D 6/04* (2013.01)
USPC ................................ 701/41; 180/446; 701/51

(58) Field of Classification Search
CPC .... B62D 5/0463; B62D 7/159; B62D 5/0481; B62D 6/008; B62D 6/02; B62D 6/04; B62D 6/03
USPC ............. 701/31.4, 41, 51; 180/443, 444, 446, 180/466, 402, 404; 74/388, 335
See application file for complete search history.

(56) References Cited

U.S. PATENT DOCUMENTS 5,473,539 A * 12/1995 Shimizu et al. .................. 701/41
6,018,691 A * 1/2000 Yamamoto et al. ............. 701/41

(Continued)

FOREIGN PATENT DOCUMENTS

| EP | 1878638 A2 | 1/2008 |
|---|---|---|
| FR | 2811628 A1 | 1/2002 |
| JP | 2006281881 A | 10/2006 |
| JP | 2007008292 A | 1/2007 |

OTHER PUBLICATIONS

International Search Report PCT/FR2009/051412; Jan. 14, 2010.

*Primary Examiner* — Behrang Badii
(74) *Attorney, Agent, or Firm* — Cantor Colburn LLP

(57) ABSTRACT

The invention relates to a power assisted steering system (21) that includes an electric assist motor (22) arranged to assist the manual force exerted by a driver on the steering wheel of the automobile, a processing means (23) arranged to control the electric assist motor (22), the processing means (23) including a means (28) for predetermining a signal (S3) for controlling the electric assist motor on the basis of a first operation signal (S1) determined on the basis of the angular position of the electric assist motor, and a second operation signal (S2) determined on the basis of the measurement or calculation of the angular acceleration of the electric assist motor and the measurement or calculation of the assistance torque output by the electric assist motor.

9 Claims, 2 Drawing Sheets

(56) References Cited

U.S. PATENT DOCUMENTS

| | | |
|---|---|---|
| 6,250,419 B1 | 6/2001 | Chabaan |
| 6,450,287 B1 | 9/2002 | Kurishige et al. |
| 7,568,551 B2 * | 8/2009 | Satake .......................... 180/446 |
| 2007/0043490 A1 | 2/2007 | Yokota |
| 2007/0209864 A1 * | 9/2007 | Segawa et al. ................ 180/446 |
| 2007/0233344 A1 * | 10/2007 | Satake ........................... 701/41 |
| 2009/0240389 A1 * | 9/2009 | Nomura et al. ................. 701/29 |

* cited by examiner

POWER ASSISTED STEERING FOR AN AUTOMOBILE

TECHNICAL FIELD

The present invention relates to a power assisted steering system, for example electric, for an automobile.

BACKGROUND

FIG. 1 recalls the main elements making up a power assisted steering system, for example electric, of an automobile. Such a steering system comprises, on one hand, a mechanical portion comprising a steering wheel 2 rotatably connected to a steering column 3, whereof the remote end of the wheel 2 carries a steering pinion engaged with a steering rack 4, slidingly mounted in a steering gear-box 5. The two opposite ends of the steering rack 4 are connected, respectively, via connecting rods 6 and 7, to the right and left steering wheels (not shown) of the vehicle. The steering system comprises, to assist the manual force exerted by the vehicle's driver on the wheel 2, an electric assist motor 8 with two directions of rotation. The output shaft of the assist motor is coupled, via a speed reducer 9, in particular with worm and cylindrical worm wheel or worm train, to the steering column 3 or the steering pinion or the steering rack 4 directly, so as to transmit an engine torque (possibly also a resistant torque) to said element. The electric assist motor 8 is controlled by an onboard electronic computer 10, which receives and processes various signals, coming from sensors.

In one usual embodiment, the electronic computer 10 in particular receives an electric signal coming from a torque sensor 11 placed on the steering column 3, and thus measuring the torque exerted by the driver on the steering wheel 2, and an electric signal coming from a speed sensor 12 of the vehicle.

From these various pieces of information, the electronic computer 10 controls the electric assist motor 8, by defining a torque or assist force at any moment, able to amplify or, on the contrary, offset the force applied by the driver on the wheel 2, according to predefined "assist laws."

It must be noted that the torque sensor used in such a power assisted steering system is complex to implement and calibrate.

In order to resolve these drawbacks, it is known, in particular from patent document U.S. Pat. No. 6,250,419, to produce a power assisted steering system without torque sensor.

However, such a power assisted steering system is likely to cause instabilities in the control of the assist motor that can compromise the safety of the driver and passengers in an automobile equipped with such a power assisted steering system.

Indeed, under limit usage conditions (e.g. under conditions with very low traction, very sudden changes of traction of the black ice patch type), the automobile's driver's feeling, i.e. the torque the driver must exert on the steering wheel to move it, can be inconsistent with the driving situation and therefore bother the driver. This disruption can cause undesired movements of the steering wheel, and thereby compromise the safety of the driver and any passengers in the automobile.

BRIEF SUMMARY

The present invention primarily aims to provide a power assisted steering system without torque sensor that makes it possible to keep the feeling of a driver of a vehicle equipped with this system consistent with the dynamics of the vehicle.

To that end, the present invention relates to a power assisted steering system for an automobile comprising:
  an electric assist motor arranged to assist the manual force exerted by a driver on the steering wheel of the automobile,
  a processing means arranged to control the electric assist motor,
  a means for calculating or measuring the assist torque output by the electric assist motor,
  a means for measuring the angular position of the electric assist motor,
  characterized in that
  the processing means comprises a means for determining a signal for controlling the electric assist motor on the basis of:
    a first operation signal determined on the basis of the angular position of the electric assist motor,
    a second operation signal determined on the basis of:
      the measurement or calculation of the angular acceleration of the electric assist motor,
      the measurement or calculation of the assistance torque output by the electric assist motor.

The determination of the control signal of the electric assist motor in particular from the first and second operation signals defined above makes it possible to control the assist effort provided by the electric assist motor so as to make the driver's feeling tend towards a feeling normally desired for a given dynamic situation, without requiring the presence of a dedicated torque sensor.

Thus, the power assisted steering system according to the invention makes it possible to keep the feeling of a driver of an automobile equipped with this system consistent with the dynamics of the automobile, and therefore not to compromise the safety of the automobile's driver and passengers.

According to one embodiment of the invention, the means for determining the control signal is arranged to nuance the taking into account of the first operation signal or the second operation signal as a function of the driving conditions.

Advantageously, the processing means comprises, on one hand, a means for comparing the theoretical dynamic state of the electric assist motor with the actual dynamic state of the electric assist motor determined from the measurement or calculation of the angular acceleration of the electric assist motor and the measurement or calculation of the assistance torque output by the electric assist motor, and on the other hand, the means for calculating the second operation signal arranged to calculate the second operation signal as a function of the comparison the theoretical and actual dynamic states of the electric assist motor.

Preferably, the processing means comprises a first calculating means arranged to calculate, from the comparison of theoretical dynamic state of the electric assist motor with the actual dynamic state of the electric assist motor, a signal representing the force resisting the steering rack.

According to one embodiment of the invention, the processing means comprises two calculating means arranged to calculate, from the comparison of the theoretical dynamic state of the electric assist motor with the actual dynamic state of the electric assist motor, a signal representative of the driver's action on the steering wheel of the automobile. Signal representative of the driver's action on the steering wheel refers to a signal representative of the torque or turning effort exerted by the driver on the steering wheel, or a signal representative of the turning direction of the steering wheel.

Advantageously, the means for calculating the second operation signal is arranged to calculate the second operation signal as a function of the signal representative of the force resisting the steering rack and the signal representative of the driver's action on the steering wheel of the automobile. These arrangements make it possible to improve the control of the electric assist motor because the signals representative of the force resisting the steering rack and the driver's action on the steering wheel of the automobile, respectively, make it possible on one hand to take into account the dynamics of the automobile, including under limit usage conditions, and on the other hand to take into account the driver's action on the steering wheel.

Preferably, the means for determining the control signal of the electric assist motor is arranged to limit the taking into account of the second operation signal so as to keep the control signal in a defined interval on either side of the value of the first operation signal.

According to one embodiment of the invention, the power assisted steering system comprises a speed measuring means arranged to measure the longitudinal speed of the automobile.

Advantageously, the processing means comprises a means for calculating the first operation signal arranged to calculate the first operation signal as a function of the angular position of the electric assist motor and the longitudinal speed of the automobile.

Preferably, the means for calculating the second operation signal is arranged to calculate the second operation signal also as a function of the longitudinal speed of the automobile.

BRIEF DESCRIPTION OF THE DRAWINGS

In any event, the invention will be well understood using the following description in reference to the appended diagrammatic drawing showing, as a non-limiting example, one embodiment of this electric power assisted steering system.

DETAILED DESCRIPTION

Figure 1:
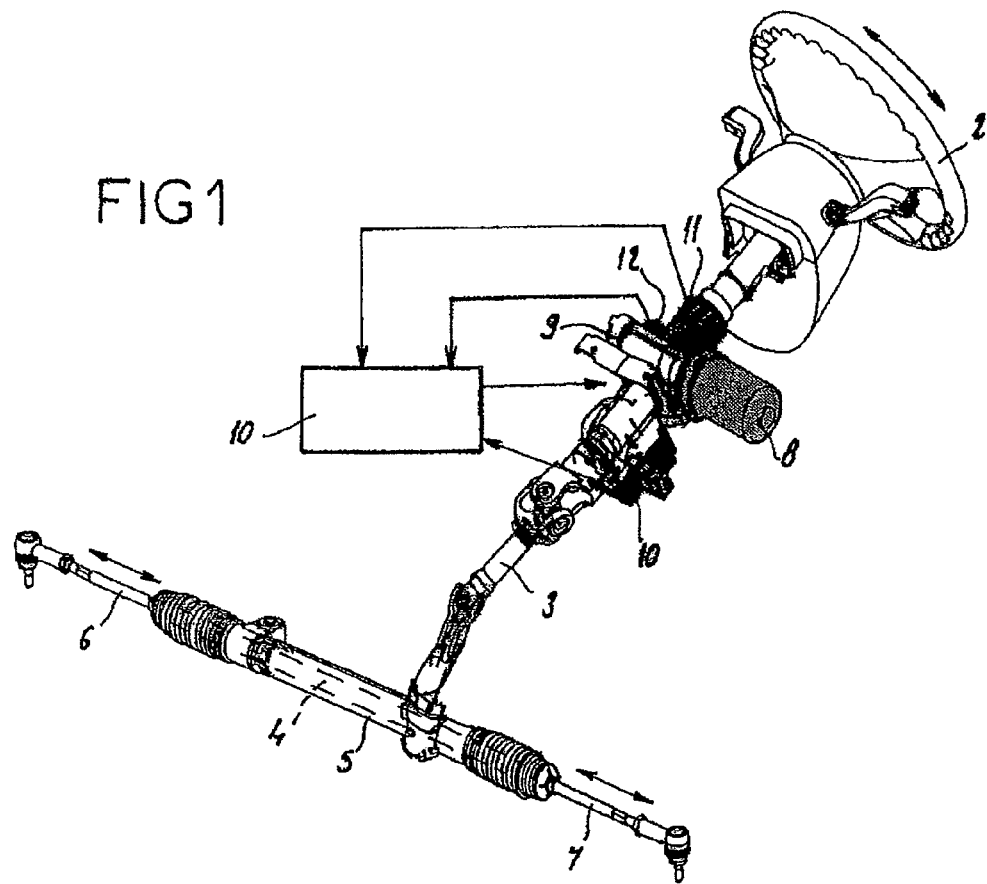
FIG. 1 (already mentioned) is a diagrammed perspective view of an electric power assisted steering system on a column with a traditional design.
Figure 2:
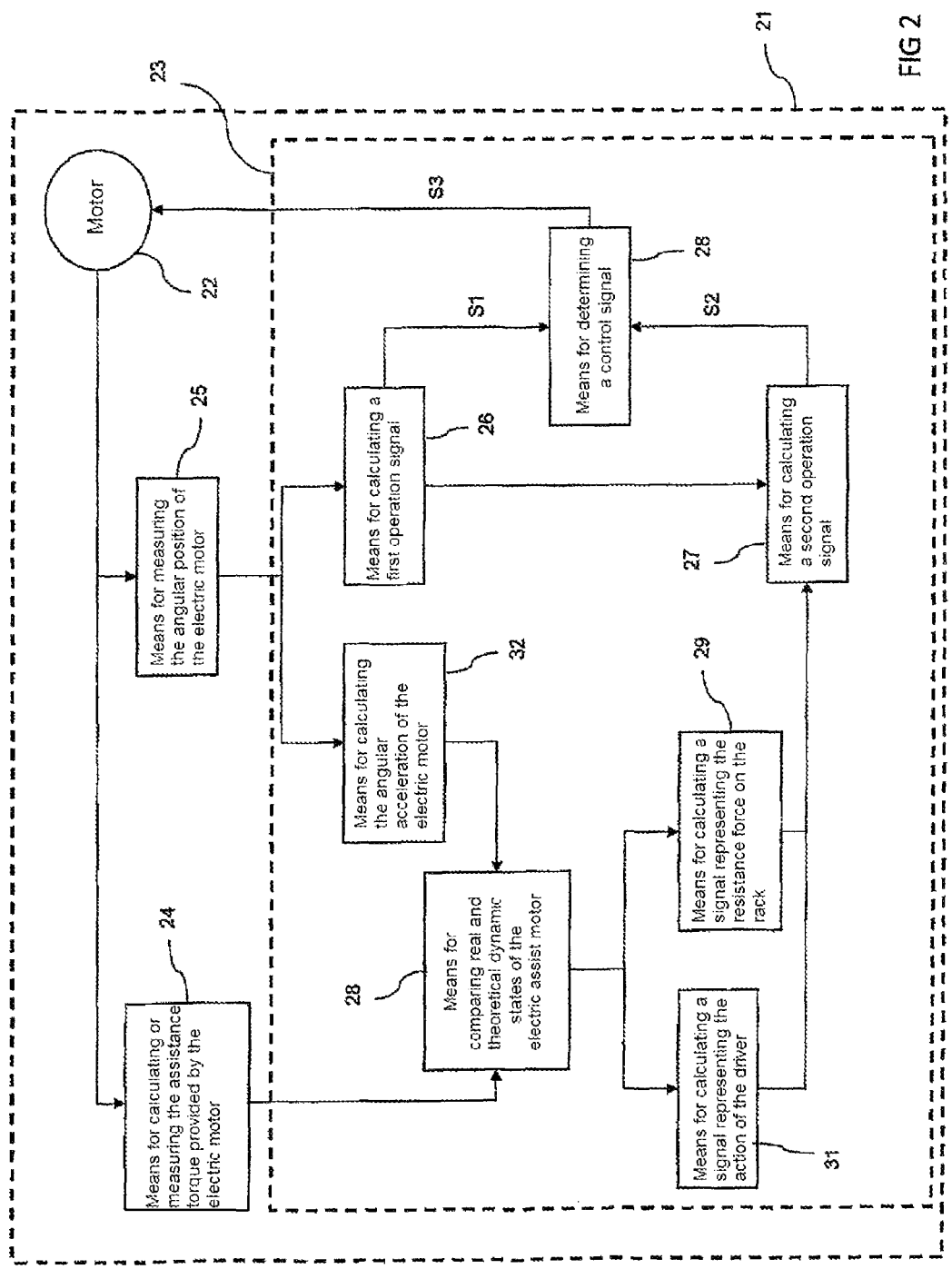
FIG. 2 is a partial diagrammed view in the form of a block diagram of an electric power assisted steering system according to the invention.

FIG. 2 shows an electric power assisted steering system 21 for an automobile comprising:
an electric assist motor 22 arranged to assist the manual force exerted by a driver on the steering wheel of the automobile,
a processing unit 23 arranged to control the electric assist motor,
a means 24 for calculating or measuring the assistance torque output by the electric assist motor,
a means 25 for measuring the angular position of the electric assist motor.

The processing unit 23 comprises:
a means 26 for calculating a first operation signal 51 arranged to calculate the first operation signal as a function of the angular position of the electric assist motor,
a means 27 for calculating a second operation signal S2 arranged to calculate the second operation signal,
a means 28 for determining a control signal S3 of the assist motor as a function of the first operation signal 51 and the second operation signal S2.

The processing unit 23 also comprises:
a means 28 for comparing the theoretical dynamic state of the electric assist motor 22 with the actual dynamic state of the electric assist motor determined from the measurement or calculation of the angular acceleration of the electric assist motor and the measurement or calculation of the assistance torque output by the electric assist motor,
a calculating means 29 arranged to calculate, from the comparison of the theoretical dynamic state of the electric assist motor with the actual dynamic state of the electric assist motor, a signal representative of the force resisting the steering rack,
a calculating means 31 arranged to calculate, from the comparison of the theoretical dynamic state of the electric assist motor with the actual dynamic state of the electric assist motor, a signal representative of the driver's action on the steering wheel of the automobile, for example a signal representative of the force or turning direction of the steering wheel.

Advantageously, the processing unit 23 also comprises a means 32 for calculating the angular acceleration of the electric assist motor from the measurement of the angular position of the electric assist motor.

The means 27 for calculating the second control signal S2 is arranged to calculate the second control signal S2 as a function of the signal representative of the force resisting the steering rack and the signal representative of the driver's action on the steering wheel of the automobile.

The means 28 for determining the control signal S3 of the assist motor 22 limits the taking into account of the second operation signal S2 so as to keep the control signal S3 in an interval defined on either side of the value of the first operation signal S1.

The width of the interval is for example defined as a percentage of the value of the first operation signal S1.

According to one embodiment of the invention, the electric power assisted steering system 21 comprises a speed measuring sensor (not shown in FIG. 2) arranged to measure the longitudinal speed of the automobile.

According to this embodiment, the means 26 for calculating the first operation signal S1 is preferably arranged to calculate the first operation signal as a function of the angular position of the electric assist motor and the longitudinal speed of the automobile.

According to this embodiment, the means 27 for calculating the second operation signal S2 is advantageously arranged to calculate the second operation signal also as a function of the longitudinal speed of the automobile.

According to another embodiment of the invention, the means for calculating the first and second operation signals and the means for determining the control signal could be made up of electronic or software functions arranged in a same processor, or separate processors.

The power assisted steering system could be an electrohydraulic assisted power steering system, and not a completely electric one.

The invention claimed is:
1. A power assisted steering system for an automobile comprising:
an electric assist motor arranged to assist manual force exerted by a driver on a steering wheel of the automobile,
a processing means arranged to control the electric assist motor,
a means for calculating or measuring assist torque output by the electric assist motor,
a means for measuring angular position of the electric assist motor, wherein
the processing means comprises a means for determining a signal for controlling the electric assist motor on the basis of:

a first operation signal determined on a basis of an angular position of the electric assist motor, a second operation signal determined on a basis of:
- a measurement or calculation of angular acceleration of the electric assist motor,
- a measurement or calculation of the assistance torque output by the electric assist motor.

2. The system according to claim 1, wherein the processing means comprises a means for comparing a theoretical dynamic state of the electric assist motor with an actual dynamic state of the electric assist motor determined from the measurement or calculation of the angular acceleration of the electric assist motor and the measurement or calculation of the assistance torque output by the electric assist motor, and wherein the processing means comprises a means for calculating the second operation signal arranged to calculate the second operation signal as a function of the comparison the theoretical and actual dynamic states of the electric assist motor.

3. The system according to claim 2, wherein the processing means comprises a first calculating means arranged to calculate, from the comparison of the theoretical dynamic state of the electric assist motor with the actual dynamic state of the electric assist motor, a signal representing a force resisting the steering rack.

4. The system according to claim 2, wherein the processing means comprises two calculating means arranged to calculate, from the comparison of the theoretical dynamic state of the electric assist motor with the actual dynamic state of the electric assist motor, a signal representative of the driver's action on the steering wheel of the automobile.

5. The system according to claim 4, wherein the means for calculating the second operation signal is arranged to calculate the second operation signal as a function of the signal representative of the force resisting the steering rack and the signal representative of the driver's action on the steering wheel of the automobile.

6. The system according to claim 1, wherein the means for determining the control signal of the electric assist motor is arranged to limit the taking into account of the second operation signal so as to keep the control signal in a defined interval on either side of the value of the first operation signal.

7. The system according to claim 1, further comprising a speed measuring means arranged to measure longitudinal speed of the automobile.

8. The system according to claim 7, wherein the processing means comprises a means for calculating the first operation signal arranged to calculate the first operation signal as a function of the angular position of the electric assist motor and the longitudinal speed of the automobile.

9. The system according to claim 7, wherein the means for calculating the second operation signal is arranged to calculate the second operation signal also as a function of the longitudinal speed of the automobile.

\* \* \* \* \*